United States Patent
Bartolotti

(10) Patent No.: US 6,891,348 B2
(45) Date of Patent: May 10, 2005

(54) SYNCHRONOUS MOTOR WITH CURRENTS CONTROLLED BY A SINGLE HALL SENSOR AT HIGH SPEEDS

(75) Inventor: Michael Bartolotti, Bellinzona (CH)

(73) Assignee: Ballado Investments, Inc., Panama (PA)

( * ) Notice: Subject to any disclaimer, the term of this patent is extended or adjusted under 35 U.S.C. 154(b) by 0 days.

(21) Appl. No.: 10/480,937

(22) PCT Filed: Jan. 30, 2003

(86) PCT No.: PCT/IB03/00317
§ 371 (c)(1),
(2), (4) Date: Dec. 16, 2003

(87) PCT Pub. No.: WO2004/068695
PCT Pub. Date: Aug. 12, 2004

(65) Prior Publication Data
US 2004/0245960 A1 Dec. 9, 2004

(51) Int. Cl.⁷ .................................................. H02P 1/46
(52) U.S. Cl. ........................ 318/715; 318/138; 318/254; 318/439
(58) Field of Search ................................. 318/715, 437, 318/445, 138, 257, 439, 701, 700, 711, 712, 717

(56) References Cited

U.S. PATENT DOCUMENTS

| | | | |
|---|---|---|---|
| 5,079,467 A | 1/1992 | Dorman | |
| 6,384,554 B1 | 5/2002 | Karwath et al. | |
| 2003/0184247 A1 * | 10/2003 | Horng et al. | 318/445 |
| 2003/0210006 A1 * | 11/2003 | Kusaka | 318/437 |

FOREIGN PATENT DOCUMENTS

EP         0 413 032       2/1991

* cited by examiner

Primary Examiner—Karen Masih
(74) Attorney, Agent, or Firm—Young & Thompson

(57) ABSTRACT

Electric motor for driving members that rotate at speeds of greater than 40,000 revolutions per minute, includes a stator housing induction coils, a rotor supporting multiple permanent magnets and located coaxially inside the stator, and multiple Hall sensors integral with the stator and capable of detecting the position of one or more points on the rotor as it rotates in order appropriately to time the injection of the induction currents into the coils as a function of the position of the permanent magnets. The motor includes elements for deactivating all but one of the Hall sensors when the rotor speed of oration exceeds 40,000 revolutions/mm, elements for measuring the rotor speed of rotation as it describes each n-th revolution; and elements for bringing about in the next or (n+1) th revolution of the rotor the injection of the currents into the coils.

8 Claims, 2 Drawing Sheets

Figure 1:
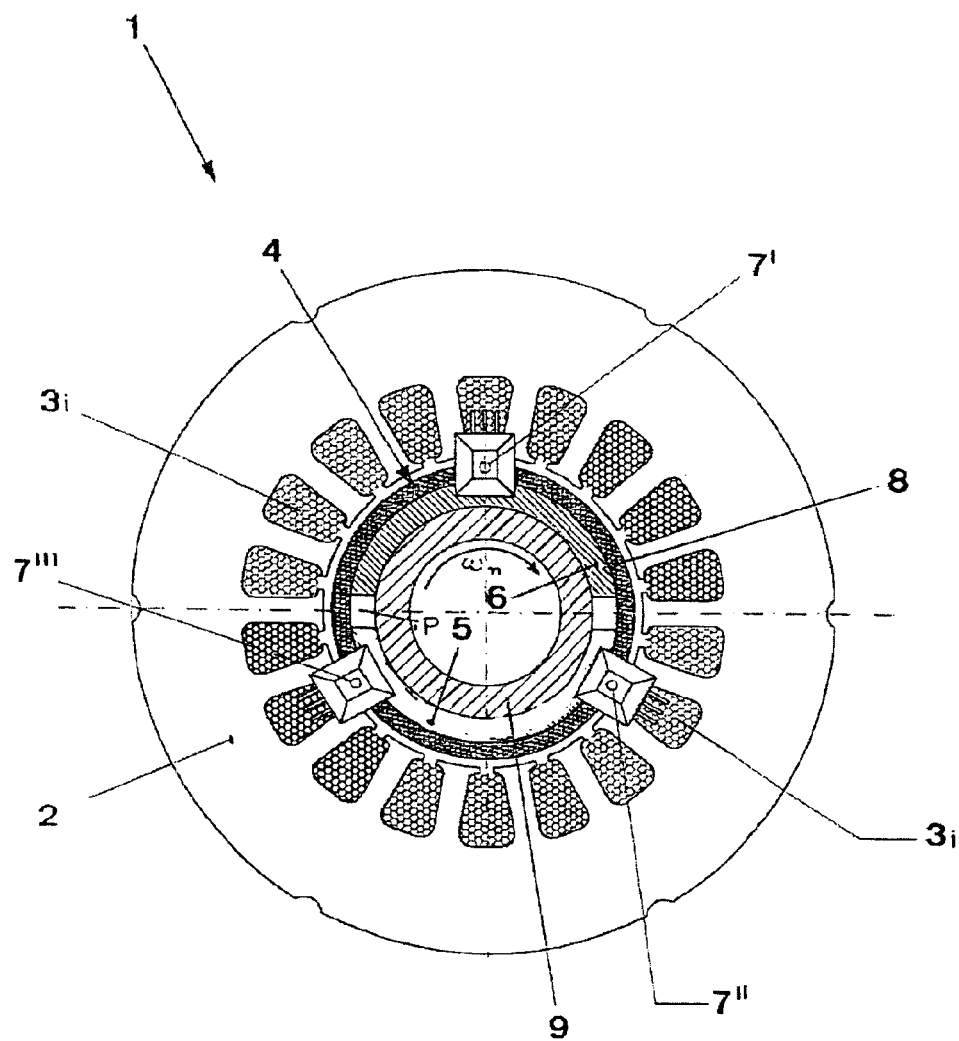

SYNCHRONOUS MOTOR WITH CURRENTS CONTROLLED BY A SINGLE HALL SENSOR AT HIGH SPEEDS

The present invention relates to electric motors used for the very-high-speed rotation of rotating members, a typical example of which would be chucks for machining at speeds of greater than 40 000 revolutions per minute.

As is well known, an electric motor of this type consists of a stator in which a number of induction coils are housed, the stator being arranged coaxially around a rotor on which permanent magnets are mounted.

The injection of the induction currents into the above-mentioned coils must be controlled in such a way that the interaction of the magnetic fields created by the currents with the fields of the permanent magnets generates, with the least possible losses, the desired dynamic effect on the rotor, transmitting to it a mechanical torque of predetermined value. In order to correctly time the injection of these currents, which are usually of sinusoidal a.c. form, current practice is to use several Hall sensors which, as those skilled in the art know, are capable of detecting the relative positions of the polarities of the magnets as the rotor turns. These sensors are however only able to detect the poles of the magnets approaching or receding from the points where the sensors are installed, for which reason in the most typical configuration, which is of three Hall sensors arranged at angular intervals of 120 degrees and rotors with two opposing circular-sector magnets, each extending through an angle of 180 degrees, the indication of the position of the rotor which the 3 sensors in question can obtain is reduced to an indication of which sextant (i.e. which angular zone of 60 degrees) is occupied by one of the poles of the said magnets.

This has the consequence that, especially at high speeds of rotation, large thermal losses occur due to undesirable increases in the magnitude of the induction currents.

Hitherto, because of all these circumstances, virtually the only electric motors used for high speeds of rotation have been asynchronous motors. The inventor of the present innovation has however devised an electric motor, provided with the sensing and controlling means described above, which has technical characteristics enabling it to operate synchronously, as the relative stator/rotor position is detected with very great precision (with an error of less than 0.5%).

To be specific, in the motor of the invention, while the same component parts as described above are present, there are also means which deactivate all but one of the Hall sensors when the speed of rotation exceeds 40 000 revolutions per minute. From that point on other means detect for each revolution the time taken by a magnet to rotate sufficiently to reverse its polarity as it passes in front of the still-active Hall sensor (in the case of two magnets only, the time taken to rotate 180°), and the induction currents are "phased" on the next revolution on the basis of simple considerations of proportionality between the position of one pole of the magnets and the time that has passed since the last detection indicating its proximity to the still-active sensor.

This is made possible by the fact that, at speeds greater than 40 000 revolutions per minute, the maximum acceleration that can be imparted to the rotor in one revolution (that is 360°) is that which brings an increase in the angular velocity of less than 0.5%, which for practical purposes is an effectively negligible increase.

If the above-described means act continuously on each revolution of the rotor the effect is to detect the relative positions of the magnets of the rotor in the course of an (n+1)th revolution on the basis of the data detected and calculated for the previous n-th revolution, with a maximum error of, as already stated, less than 0.5%. Importantly, for obvious dynamic reasons, this error tends to shrink as the speed increases.

The subject of the present invention is therefore an electric motor as disclosed in the appended claim 1.

Figure 2:
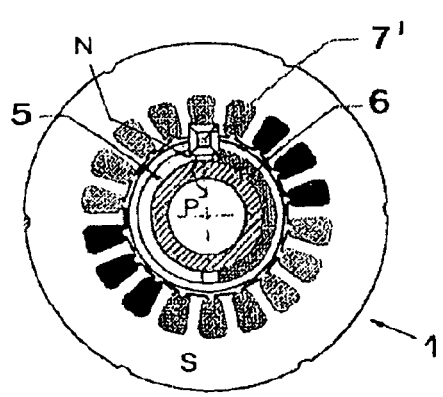
Figure 3:
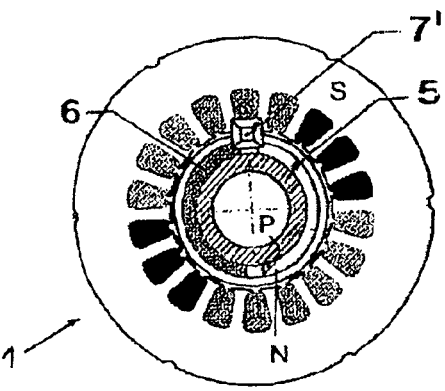
Figure 4:
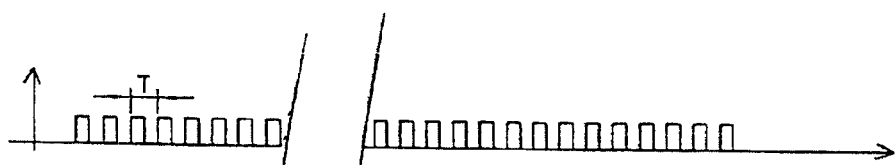
Figure 5:
Figure 6:
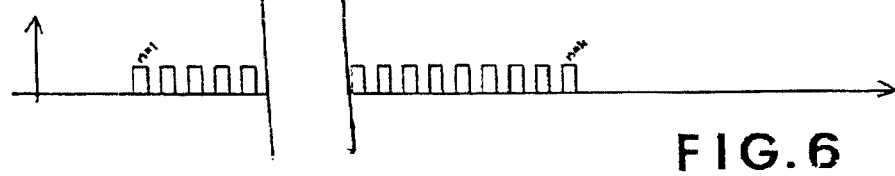

A more detailed description will now be given of a preferred illustrative embodiment of the motor of the invention, referring also to the appended drawings, which show:

in FIG. 1 a cross section thereof;

in FIGS. 2 and 3 the same section as in FIG. 1, with the magnets before and after executing a 180° rotation, and with only the still-active sensor visible;

in FIG. 4 a graph of the pulses emitted by an emitter;

in FIG. 5 a graph indicating the range of intervention of the still-active Hall sensor, due to the rotation of the magnets of FIGS. 2 and 3; and in FIG. 6 the series of pulses emitted by the said emitter in the range of intervention of the sensor indicated in FIG. 5.

FIG. 1 shows an electric motor 1 according to the invention, composed of a stator 2 made up of laminations in which radial cavities are formed to house the induction coils 3$i$.

Positioned coaxially inside the stator 2 is a rotor 4 consisting of a hollow shaft 9 of ferromagnetic material, attached to the surface of which are two magnets 5, 6 in the form of opposed circular half-annuluses, each of which occupies an angular space of 180°. Of the two magnets 5, 6, one 5 is depicted as lighter, and the other 6 as darker.

Three Hall sensors 7$i$ are fixed, 120 degrees apart from each other, to the stator 2.

Suppose that, at a certain instant, the rotor 4 is turning at a speed of less than 40 000 revolutions per minute. In this situation the motor 1 of the invention works exactly like a conventional motor, using signals sent by the three sensors 7$i$ to time, with the greatest approximation possible, the currents flowing in the coils 3$i$.

In the motor 1 of the invention, however, the means which measure the angular velocity of the rotor deactivate all the sensors 7$i$ except one 7' when this velocity reaches 40 000 revolutions per minute, and other means come into action, including a high-frequency pulse emitter at e.g. greater than 10 MHz (the K pulses generated by it are indicated in FIG. 4) and a pulse counter. These components are not shown in the drawings.

Assume that the stator 4 is at a certain instant in the position shown in FIG. 2, with the North pole of the light magnet 5 opposite the still-active Hall sensor 7'. A high logic level will therefore be generated in this sensor, which will trigger the said counter of the pulses emitted by the above-mentioned emitter.

When the rotor describes an angle of 180° in the direction of rotation $\omega_n$, the said light magnet 5, performing an identical rotation, reverses the polarity presented to the sensor 7' (because its North pole has moved away from it and its South pole reached it as in FIGS. 2 and 3), and the sensor can therefore generate a low logic signal which, when appropriately transduced, interrupts the operation of the pulse counter, which at this point supplies the detected number of pulses (the range of intervention of the sensor 7' that causes activation and deactivation of the counter is shown in FIG. 5).

FIG. 6 shows the series of K pulses which the counter has detected during its operation.

Because the period T of the pulses, and their number, are known, it is possible to calculate by simple mathematical calculations, carried out by an elementary logic unit, how long the magnet 5 has taken to rotate through 180°, and consequently to define on the basis of a criterion of linear proportionality where one or more points of the magnet 5 are after any time less than the time corresponding to this rotation of 180°. Given the position of the magnet 5, it is immediately possible to also determine that of the other magnet 6 adjacent thereto, and the best timing of the induction currents can be determined as a function of the positions occupied in time by the magnets 5, 6.

It will be obvious that the calculation explained above yields exactly precise positions when the speed of rotation $\omega_n$ of the rotor is constant.

The timing of the currents is effected as such in the (n+1)th revolution on the basis of the readings and calculations carried out in the n-th revolution.

Since, as indicated, the variation of the angular velocity of the rotor 4 between the n-th revolution and the next or (n+1)th revolution is no more than 0.5%, it follows that the phasing of the induction currents of the motor of the invention is effected with a maximum position error of 0.5%, an unusual result and extremely advantageous for the purposes of moderating the temperatures in the various parts of the motor and increasing its efficiency.

One further constructional detail of the motor 1 of the invention should be noted: as is more clearly visible in FIG. 1, a carbon-fibre bush 8 is force-fitted around the outer surface of the magnets 5, 6 to act as a containment ring for the centrifugal forces acting on these magnets 5, 6.

What is claimed is:

1. Electric motor (1) for driving members that rotate at speeds of greater than 40 000 revolutions per minute, comprising a stator (2) housing induction coils (3i), a rotor (4) supporting multiple permanent magnets (5, 6) and located coaxially inside the stator (2), and multiple Hall sensors (7', 7", 7'''), integral with the stator (2) and capable of detecting the position of one or more points on the rotor (4) as it rotates in order appropriately to time the injection of the induction currents into the said coils (3i) as a function of the position of the permanent magnets (5, 6), which motor is characterized in that it is provided with:

a) means capable of deactivating all but one (7') of the Hall sensors when the speed of rotation of the rotor (4) exceeds 40 000 revolutions/mm.;

b) means capable of measuring the speed of rotation $\omega_n$ of the rotor (4) as it describes each n-th revolution by measuring the time taken by a point (P) on the rotor (4) to perform a predetermined rotation of x degrees with respect to the still-active sensor (7') during the said n-th revolution; and c) means capable of bringing about in the next or (n+1)th revolution of the rotor (4) the injection of the currents into the coils (3i) as a function of the positions occupied in time by the said point (P) with respect to the abovementioned still-active Hall sensor (7'), this injection being calculated by considering the speed of rotation of the rotor (4) in the (n+1)th revolution to be equal to that in the n-th revolution;

the said electric motor (1) having synchronous operation.

2. Electric motor according to claim 1, in which the said means capable of measuring the speed of rotation $\omega_n$ of the rotor (4) as it executes an n-th revolution consist of a high-frequency pulse emitter equipped with a system capable of measuring the number of pulses emitted while the said point (P) has described the said predetermined rotation of x degrees with respect to the still-active Hall sensor (7').

3. Electric motor according to claim 1, in which there are two of the said permanent magnets (5, 6) and they are attached to the rotor (4) in such a way as to occupy an angular space of 180°, their North and South poles being located at the ends of this space, the said point (P) being the point of greatest proximity of two adjacent poles of the said magnets (5, 6), and the said predetermined rotation of x degrees being the rotation corresponding to a flat angle, which corresponds to a rotation of the magnets (5, 6) that brings about reversal of the positions of the poles of each magnet (5, 6) with respect to the said point (P).

4. Electric motor according to claim 1, in which a carbon-fibre bush (8) is force-fitted, around the rotor (4), on the outer surface of the magnets (5, 6) and rotates with very little clearance inside the stator (2).

5. Electric motor according to claim 2, in which there are two of the said permanent magnets (5, 6) and they are attached to the rotor (4) in such a way as to occupy an angular space of 180°, their North and South poles being located at the ends of this space, the said point (P) being the point of greatest proximity of two adjacent poles of the said magnets (5, 6), and the said predetermined rotation of x degrees being the rotation corresponding to a flat angle, which corresponds to a rotation of the magnets (5, 6) that brings about reversal of the positions of the poles of each magnet (5, 6) with respect to the said point (P).

6. Electric motor according to claim 2, in which a carbon-fibre bush (8) is force-fitted, around the rotor (4), on the outer surface of the magnets (5, 6) and rotates with very little clearance inside the stator (2).

7. Electric motor according to claim 3, in which a carbon-fibre bush (8) is force-fitted, around the rotor (4), on the outer surface of the magnets (5, 6) and rotates with very little clearance inside the stator (2).

8. Electric motor according to claim 5, in which a carbon-fibre bush (8) is force-fitted, around the rotor (4), on the outer surface of the magnets (5, 6) and rotates with very little clearance inside the stator (2).

* * * * *